United States Patent [19]

Arpin

[11] 3,809,808

[45] May 7, 1974

[54] VIDEO SYNC SEPARATOR

[75] Inventor: Lee James Arpin, Lakewood, N.J.

[73] Assignee: Bell Telephone Laboratories, Incorporated, Murray Hill, N.J.

[22] Filed: Sept. 13, 1972

[21] Appl. No.: 288,720

[52] U.S. Cl. .............................................. 178/7.3 S
[51] Int. Cl. .............................................. H04n 5/08
[58] Field of Search ......................... 178/7.3 S, 7.5 S

[56] References Cited

UNITED STATES PATENTS 3,485,947 12/1969 Kent et al. ........................ 178/7.3 S

*Primary Examiner*—Robert L. Griffin
*Assistant Examiner*—George G. Stellar
*Attorney, Agent, or Firm*—W. L. Keefauver

[57] ABSTRACT

A video signal is coupled by an emitter-follower through a capacitor to the base of a transistor connected in a common emitter configuration with its emitter directly connected to a clamping potential. A potential representing the average magnitude of the video signal is developed by an average detector and coupled to one input of a comparator circuit, a second input of which is connected to the clamping potential. Variations in the average magnitude of the video signal causes variations in a control signal developed by the comparator circuit, which control signal is utilized to vary the amount of current delivered to the plate of the coupling capacitor which is directly connected to the clamping transistor. With the time constant of the average detector set equal to at least one video frame interval, larger currents are provided to the coupling capacitor for larger video signals thereby permitting a wide variation in the magnitude of the video signals that may be coupled to the sync separator.

2 Claims, 3 Drawing Figures

VIDEO SYNC SEPARATOR

BACKGROUND OF THE INVENTION

This invention relates to video sync separators and, more particularly, to a video sync separator that is useful in a baseband video system where the video signals may be subject to large variations in amplitude.

A transistor clamp circuit that may be utilized as a video sync separator is shown in FIGS. 8–13, page 277, of *Pulse, Digital, and Switching Waveforms*, by Jacob Millman and Herbert Taub, McGraw-Hill, Inc., 1965. In the Millman and Taub clamp circuit, the video signal is coupled through a capacitor to the base of a transistor whose emitter is connected to a reference potential. When the sync tip occurs in the video signal, the transistor is driven into conduction and the video signal is clamped to a potential equal to the reference potential plus the base-to-emitter potential drop. During the sync pulse, an energizing pulse is developed at the collector electrode. During the remaining portion of the video signal, the transistor is generally back biased by the video signal. In order to insure that the sync tip will definitely drive the transistor into conduction, a current is provided to the plate of the capacitor which is coupled to the base electrode by way of a resistor whose other end is connected to a potential source. Ideally, the potential developed on the capacitor by this current during the active region of the video signal is caused to be approximately equal to one-half of the video sync pulse magnitude. As a result, the video sync pulse is caused to penetrate the forward-biased potential of the transistor even under circumstances where the video signal has been subject to a phenomenon known as tilt.

In baseband video systems where the video signal is subject to many capacitive couplings during transmission over the system, the inadequate transfer of very low frequency energy may cause the video signal to undergo a phenomenon known to those skilled in the art as tilt. The result of tilt is to produce a sync pulse at a potential substantially different from the previous sync pulses in the video signal. In essence, the video signal will be tilted toward the dc axis which the signal has developed during the previous video lines. The sync pulse which undergoes the maximum tilt will be either at a higher or lower potential than the previous sync pulse, the direction being dependent on the polarity of the video signal and on whether a substantial all-white line has followed several substantially all-black lines or vice versa.

In a clamp circuit of the type shown by Millman and Taub, the video signal is permitted to have a tilt during one video line which is somewhat less than half of the video sync pulse amplitude. The current provided by the resistor to the base of one plate of the coupling capacitor will insure that even under a condition of tilt the sync pulse will continue to penetrate the forward-biased potential of the clamping transistor. The amount of potential provided by this resistor to one plate of the capacitor is determined by the magnitude of the lowest amplitude video signal expected to be received by the transistor sync separator. Obviously, the current provided by this resistor must not build up a potential on the coupling capacitor which would be large enough to drive the blanking level of the video signal through the forward-biased potential of the transistor clamp. The permitted potential deviation of the sync pulse will correspond to a certain amount of percentage tilt in the baseband video system. If the video signal is larger in magnitude when passing through the system, this same percentage tilt will cause a larger deviation in potential. The amount of potential shift encountered by a video signal larger than the above-mentioned lowest amplitude video signal could result in either a sync pulse which does not reach the forward-biased potential of the transistor clamp or a blanking level which is sufficiently large to drive the transistor clamp into conduction. Accordingly, larger magnitude video signals will not be permitted to encounter as high a percentage of tilt in the video system and the amplitude range of video signals permitted in the video system will be limited by the performance of the video sync separator.

SUMMARY OF THE INVENTION

A primary object of the present invention is to provide a video sync separator which will accommodate larger percentage tilts in the video system for large gain variations in the video signal amplitude.

Another object of the present invention is to provide a video sync separator which is relatively insensitive in its performance to variations in the clamping potential.

These objects and others are achieved in accordance with the present invention wherein the coupling capacitor in a video sync separator has one plate directly connected to the base of a transistor whose emitter is connected to the clamping potential. An average detector with its input connected to the base of the transistor develops a potential whose magnitude is an indication of the average magnitude of the input video signal. A comparator circuit having one input coupled to receive the average potential and a second input coupled to the clamping potential develops a control signal in response to the magnitude of the average potential. This control signal is then utilized to control the amount of current coupled to the plate of the capacitor which is directly connected to the base of the clamping transistor. As a result, the current is caused to be directly proportional to the average magnitude of the input video signal, thereby causing a larger potential to be developed on the capacitor during the active region of the video signal in response to a larger magnitude of input video signal. Consequently, the percentage of tilt that may be permitted in the baseband video system is no longer limited by a range of magnitudes in video signals since the larger video signals may be permitted the same percentage of tilt as the low amplitude video signals.

A feature of the present invention is the fact that the resistors in the comparator circuit may be adjusted in value such that the operation of the video sync separator is totally independent of variations in the clamping potential. Alternatively, resistors may be chosen such that the current delivered to the coupling capacitor is in direct linear relationship to the average magnitude of the input video signal.

BRIEF DESCRIPTION OF THE DRAWINGS

The invention will be more readily understood after reading the following detailed description in conjunction with the drawings, in which.

DETAILED DESCRIPTION

Figure 1:
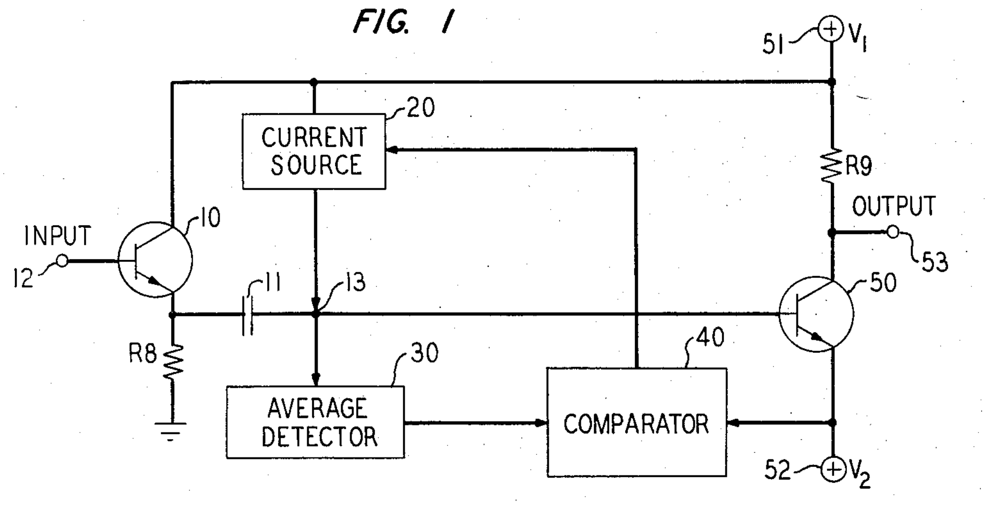
FIG. 1 is a schematic block diagram of a video sync separator constructed in accordance with the present invention.

In FIG. 1, a video signal providing video information in the form of voltage with respect to ground is coupled to input terminal 12, which in turn is directly coupled to the base of a transistor 10. Transistor 10 has its collector directly connected to a potential source 51 and its emitter electrode connected to ground through a resistor R8. Transistor 10 therefore serves as an emitter-follower in coupling the video signal on terminal 12 through to one plate of a coupling capacitor 11, the other plate of which is connected to the base electrode of a transistor 50. The emitter electrode of transistor 50 is directly connected to a potential source 52, and the collector electrode of transistor 50 is connected both to an output terminal 53 and through a resistor R9 to a potential source 51. Transistor 50 therefore operates in a fashion similar to the transistor clamp shown in the above-mentioned Millman and Taub reference.

In the embodiment shown in the present application, the video signal which is coupled to input terminal 12 presents the most positive potential during the video sync pulses. The video signal utilized by the present invention is of the standard type having a video sync pulse on each blanking pulse with a front and back porch to separate the leading and trailing edges of the sync pulse from the leading and trailing edges of the blanking level. The active region of the video signal present during the intervals between blanking pulses results in potentials much less positive than the video sync pulses, the most negative potentials representing the whitest information transmitted over the video system. A representation of the potentials developed at point 13 connected to the base of transistor 50 is shown in the waveform of FIG. 2.

Figure 2:
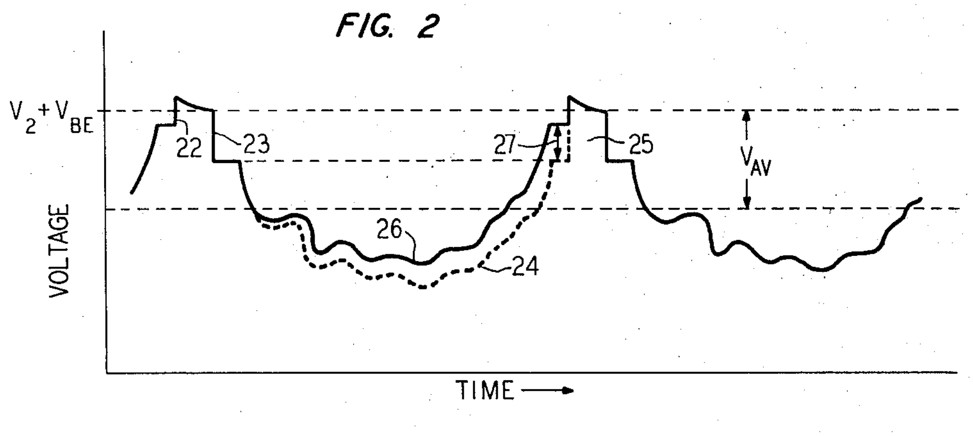
FIG. 2 is a graph of a video signal waveform useful in explaining the operation of the present invention.

In FIG. 2, the voltage rise 22 representing the leading edge of the video sync pulse causes the video sync pulse to be driven through the forward-biased potential of transistor 50 represented in FIG. 2 by the voltage designated as $V_2 + V_{BE}$. The $V_2$ represents the magnitude of the potential source 52 and the $V_{BE}$ represents the base-to-emitter potential of transistor 50 which is necessary to drive transistor 50 into conduction. During the remaining portion of the video sync pulse, the video signal at point 13 is rapidly clamped to the $V_2 + V_{BE}$ potential through the low impedance of the forward-biased base-emitter junction of transistor 50. During the voltage step 23 representing the trailing edge of the video sync pulse, transistor 50 is taken out of conduction and remains out of conduction during the active region of the video signal. Accordingly, a voltage pulse is produced at output terminal 53 representing the video sync pulse only during the intervals of the video sync pulses.

If no current were coupled to point 13, the video signal during the active region would follow the potential represented in FIG. 2 by dotted line 24. The front porch of the next video sync pulse would then result in a potential substantially identical to the rear porch of the preceding sync pulse. As a result, the next video sync pulse represented in FIG. 2 as sync pulse 25 would deliver a potential rise that would just meet the potential which is necessary to drive transistor 50 into conduction. If the video signal coupled to input 12 has been transmitted through a baseband video system with tilt, sync pulse 25 may not even rise to the same potential level as the preceding sync pulse, and therefore sync pulse 25 under these circumstances would not produce an output pulse at output terminal 53. To insure that each sync pulse does indeed present a sufficient potential to drive transistor 50 into conduction, a current is coupled to the base of transistor 50 which results in the development of a potential on capacitor 11 during the active region of the video signal. As a result, the video signal during the active region follows the solid line 26 in FIG. 2 rather than the dotted line 24. The total potential developed by this current which is coupled to one plate of the coupling capacitor 11 during one video line interval is represented in FIG. 2 as potential difference 27. This potential rise in the video signal insures that the video sync pulse will drive transistor 50 into conduction even when a tilt is present in the baseband system which results in a shift in the potential of the video sync pulse of up to approximately one-half of the video sync pulse magnitude.

As will be appreciated by those skilled in the art, the magnitude of potential 27 will be determined by the lowest magnitude of video signal presented at input terminal 12. Obviously, potential 27 cannot exceed the potential represented by the sync pulse magnitude for if it did the blanking level would be driven through the forward-biased potential of transistor 50, thereby causing an energizing pulse to be developed at output terminal 53 during the wrong interval. On the other hand, any potential 27 established for the lowest magnitude video signal will not represent as large a percentage of the video sync amplitude for any larger video signal and, therefore, the percentage tilt that may be tolerated in the baseband video system for a larger video signal will not be as great.

In accordance with the present invention, potential 27 is caused to vary in accordance with the average magnitude of the video signal present at input terminal 12. The magnitude of potential 27 is in fact caused to be directly proportional to the average magnitude of the input video signal. As a result, a wider range of video signal amplitudes may be tolerated in the video system for any given percentage of tilt in the video system. In the present invention, an average detector 30 in FIG. 1 has its input connected to the plate of capacitor 11 which is directly connected to the base of transistor 50. Average detector 30 delivers a potential to one input of a comparator circuit 40 which represents by its magnitude the average potential of the input video signal. Comparator circuit 40 compares this average potential to a reference potential derived from potential source 52, the clamping potential. A control signal developed by comparator circuit 40 is connected to a current source 20. The polarity relationships are maintained such that current source 20 delivers a larger amount of current to capacitor 11 in response to a larger average magnitude of video signal.

Figure 3:
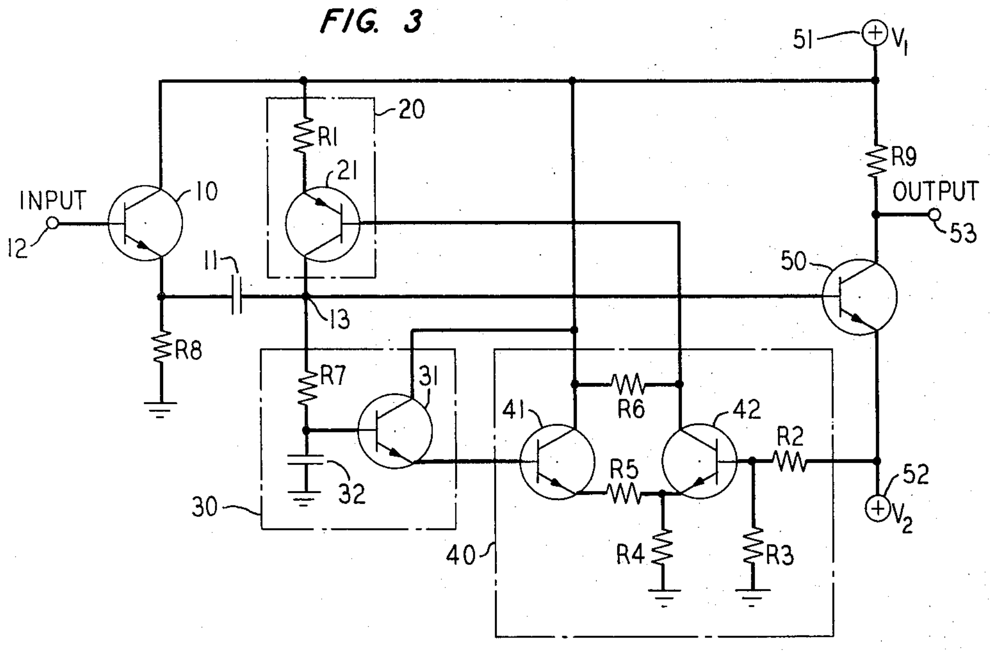
FIG. 3 is a detailed schematic diagram in which specific circuits are shown for the items disclosed as boxes in FIG. 1.

Specific circuits which may be utilized to accomplish the functions illustrated by the boxes in FIG. 1 are shown in FIG. 3. In FIG. 3, average detector 30 has an integrator circuit composed of a resistor R7 connected in series with a capacitor 32. The values of resistor R7 and capacitor 32 are chosen to provide a time constant equal to several video frame intervals in order to develop a fairly constant potential representing the average magnitude of the input video signal. In order to isolate this circuit from the impedance loading of the circuits to follow, the potential with respect to ground at the junction of resistor R7 and capacitor 32 is connected to the base of a transistor 31, the collector of which is directly connected to potential source 51. The signal provided at the emitter of transistor 31 represents by its magnitude the average magnitude of the video signal present at the base of transistor 50. In the present embodiment, the potential provided at the emitter of transistor 31 with respect to ground is actually inversely proportional to the average magnitude of the video signal where the average magnitude of the video signal is measured as represented by $V_{AV}$ in FIG. 2. The actual potential developed on the emitter of transistor 31 is equal to $(V_2 - V_{AV})$. Hence, when a small video signal is present and $V_{AV}$ is small, the actual potential on the emitter of transistor 31 is higher than in the case where $V_{AV}$ is large. This relationship, of course, only applies to the present embodiment and the invention may be practiced equally as well in a circuit where the average potential developed by average detector 30 is directly proportional to the average magnitude of the video signal.

Comparator 40 is embodied in FIG. 3 with a transistor 41 having its collector directly connected to potential source 51 and its base electrode connected to receive the potential developed by average detector 30. The emitter of transistor 41 is connected through a series connection of resistors R4 and R5 through to ground potential. The junction of resistors R4 and R5 is connected to the emitter electrode of a second transistor 42 in the comparator circuit 40. The base of transistor 42 is connected to receive a reference potential developed by a resistor divider circuit consisting of resistors R2 and R3, which resistors are connected in series between potential source 52 and ground. The collector of transistor 42 is connected through a resistor R6 to the potential source 51. This collector electrode of transistor 42 is also connected to the base electrode of a transistor 21 which, with a resistor R1 connected to its emitter electrode, provides a current source for point 13 from potential source 51. As will be apparent hereinafter, the current drawn by transistor 42 into its collector electrode through resistor R6 from potential source 51 provides a control signal for current source 20. When increased current is drawn through resistor R6, the base voltage of transistor 21 drops, and increased current is delivered from potential source 51 to one plate of capacitor 11 thereby causing a higher potential to be developed on capacitor 11 during the active region of the video signal. Conversely, when less current is drawn from the base electrode of transistor 21, less current is delivered to the plate of capacitor 11.

With the potentials as designated in FIG. 3, and assuming that the $\beta$ for all transistors is large and that all transistors have the same base-to-emitter potential drop, $V_{BE}$, the current delivered by transistor 21 to the coupling capacitor 11 may be represented by the following equation:

$$I = K_1 V_{AV} + K_2 V_2 - K_3 V_{BE},$$

where $$K_1 = R6/R5 \cdot R1,$$

$$K_2 = R6/R5 \cdot R1\{[R2/(R2 + R3)]\,[(R4 + R5)/R4] - 1\},$$

and $$K_3 = (R4 + R6)/(R1 \cdot R4). \qquad (1)$$

A qualitative understanding of the operation of the circuit may be obtained from the following general description. When $V_{AV}$, the average magnitude of the video signal, increases, the potential provided at the emitter of transistor 31 decreases as pointed out hereinabove in connection with average detector 30. With a decreased potential at the base of transistor 41, less current is drawn by transistor 41 from potential source 51, thereby causing an increased current to be drawn by transistor 42 through resistor R6 from potential source 51. This current increase occurs because the potential at the junction of resistors R4 and R5 is fixed by the derived reference potential at the base of transistor 42. With this increased current drawn through resistor R6, the potential at the base of transistor 21 drops and the amount of current delivered by current source 20 to capacitor 11 is increased. Accordingly, an increase in the average magnitude of the video signal results in an increase in the amount of current delivered by current source 20, and therefore an increase in the potential developed at point 13 during the active region of the video signal. Conversely, it may be shown that a decrease in the average magnitude of the video signal causes a decrease in the amount of current delivered by current source 20.

From the above equation it can be easily seen that the current provided by current source 20 can be made solely a function of the average magnitude of the video signal by selecting resistance values such that $K_2 V_2 = K_3 V_{BE}$. Then $I = K_1 V_{AV}$. In practice, the ratio of the desired potential difference 27 to the average magnitude of the video signal, $V_{27}/V_{AV}$, is known, and $K_1$ may be determined as follows:

$$I = (V_{27}\, C_{11})/T = K_1 V_{AV},$$

$$K_1 = (V_{27}\, C_{11})/(V_{AV}\, T), \qquad (2)$$

where $C_{11}$ is the value of capacitor 11 and T is the time available for charging of capacitor 11 during the active region interval.

As an alternative, where the potential from source 52 is subject to variations in magnitude due to poor regulation, the current provided by current source 20 may be made totally independent of the clamping potential from source 52 by selecting resistance values such that $R2/(R2 + R3) = R4/R4 + R5$. Then $K_2 = 0$, and $I = K_1 V_{AV} - K_3 V_{BE}$.

What has been described hereinabove is a specific illustrative embodiment of the present invention. Numerous modifications may, of course, be made by those skilled in the art without departing from the spirit and scope of the present invention.

I claim:

1. Apparatus for separating sync information from a video signal comprising a transistor having base, emitter, and collector electrodes, capacitor means for coupling the video signal to said base electrode, means for directly connecting the emitter electrode to a first potential source, impedance means for connecting said collector electrode to a second potential source, a current source having a control terminal and coupled to charge said capacitor means, means responsive to the video signal at said base electrode for coupling a control signal to said control terminal the magnitude of which control signal is a function of the magnitude of said video signal; said means for coupling a control signal including integrator means for developing a potential whose magnitude is a function of the average magnitude of said video signal and of the magnitude of said first potential source; said means for coupling a control signal further including a comparator circuit having two inputs, means for connecting a first one of said two inputs to receive said potential from said integrator means, and means for connecting a second one of said two inputs to said first potential source, said comparator circuit being adjusted to cause the charging current from said current source to be a function of the average magnitude of said video signal and independent of the magnitude of said first potential source.

2. Apparatus for separating sync information from a video signal comprising clamping means coupled to a clamping potential source for developing an output pulse when a signal presented to its input reaches a predetermined voltage level, capacitor means for coupling the video siganl to the input of said clamping means, integrator means responsive to the video signal at the input of said clamping means for developing a potential whose value represents the magnitude of said clamping potential source minus an average magnitude of said video signal, and current source means having a control terminal responsive to the developed potential for coupling a charging current to said capacitor means the magnitude of which current is a function of the average magnitude of said video signal but is independent of the magnitude of said clamping potential source; said current source means including a comparator circuit having two inputs, means for connecting a first one of said two inputs to receive said developed potential, and means for connecting a second one of said two inputs to said clamping potential source.

* * * * *